June 27, 1933.   F. W. LAENCHER   1,916,003
LOCK SEAL
Filed Nov. 18, 1932
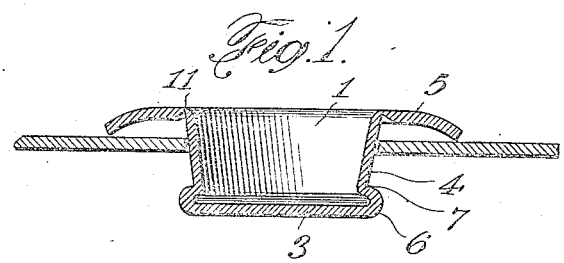
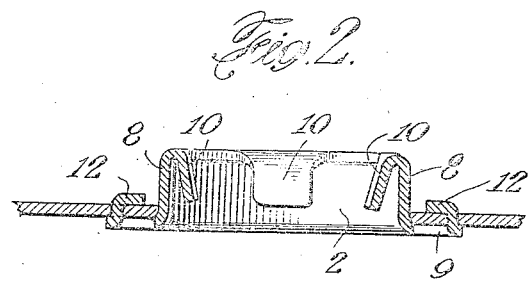
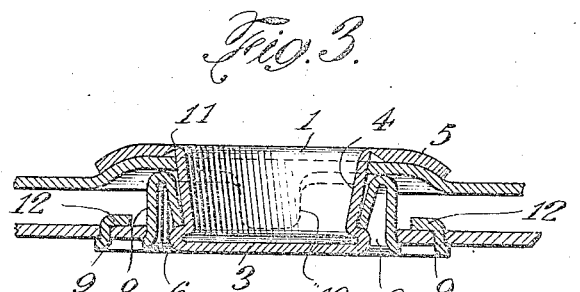
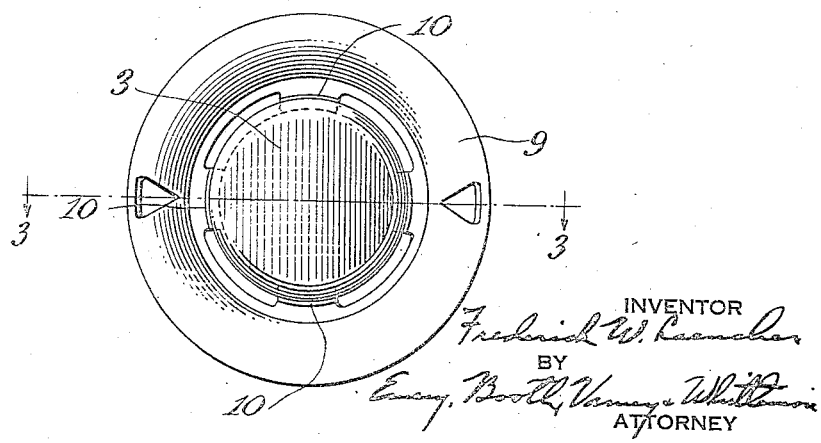
INVENTOR
Frederick W. Laencher
BY
ATTORNEY Patented June 27, 1933

1,916,003

UNITED STATES PATENT OFFICE

FREDERICK W. LAENCHER, OF ELMHURST, NEW YORK, ASSIGNOR TO A. KIMBALL COMPANY, OF NEW YORK, N. Y., A CORPORATION OF NEW YORK

LOCK SEAL

Application filed November 18, 1932. Serial No. 643,149.

This invention relates to lock seals for use in connection with various articles in which it may be desirable to guard against opening without detection.

It is an object of the invention to provide a seal which shall be simple and inexpensive to manufacture, but which shall provide adequate safeguards against opening or removal without detection.

Other objects and advantages of the invention will appear hereinafter.

A preferred embodiment of the invention selected for purposes of illustration is shown in the accompanying drawing, in which, Figure 1 is a section through one of the seal members.

Figure 2 is a section through the other seal member.

Figure 3 is an enlarged section through the seal taken on the line 3—3 of Figure 4, showing the members locked together.

Figure 4 is a bottom plan view of the seal.

Referring to the drawing, the seal comprises two mating members 1 and 2. The members are preferably made of sheet metal and may be of any desired shape, but are preferably round, as illustrated, for convenience in manufacture and in operation.

The member 1 is substantially cup shaped, having a bottom disk 3, tubular side walls 4 and a lip or flange 5 extending laterally from the upper edge of the side walls. Between the disk 3 and the side walls 4 is formed a bead or flange 6 providing a shoulder 7 for purposes hereinafter set forth.

The member 2 is somewhat similar in shape, having tubular side walls 8 terminating in a lip or flange 9, but instead of a bottom disk, the metal is cut and bent back as illustrated in Figure 4 to form a plurality of resilient prongs 10, which, when the members 1 and 2 are forced into engagement as illustrated, engage the bead 7, thus locking the members together.

In use, the members 1 and 2 are inserted in suitable apertures in the material to which they are to be secured, and the friction of the material against the tubular side walls 4 and 8, respectively, is ordinarily sufficient to retain the members. If desired, however, the members may be positively retained by small nibs 12. In the embodiment illustrated, these nibs are shown as applied to the flange 9 only, but it will be understood that they may also be applied to the flange 5 if desired.

In applying the members to an article such as an envelope, for example, in which only one of the members needs to be exposed, the member 1 is preferably the exposed member, the member 2 being placed inside the envelope where it is less accessible to tampering. Furthermore, the flange 5 is preferably provided with a weakened portion 11, which is easily broken in the event that it is attempted to pry the members apart thus indicating at once that the seal has been opened. A similar weakened portion may be provided in the flange 9, if desired, as for example, when the seals are used in such manner that both members 1 and 2 are exposed.

When it is desired to lock the seal, the two members are forced into engagement in the manner illustrated, the tubular portion 4 of the member 1 being inserted in the tubular portion 8 of the member 2 in telescoped relation, the prongs 10 snapping into place behind the bead 6 so as to prevent separation thereafter. Due to the fact that the member 1 is imperforate, it is impossible to tamper with the prongs from that side, and since the space between the tubular portion 4 and the member 2 is very small, it is difficult to tamper with the prongs from the other side. Moreover, as previously explained, in most cases, this side is enclosed and is not accessible to tampering in any event.

It will be understood that the invention may be variously modified and embodied within the scope of the subjoined claims.

I claim as my invention:

1. A lock seal comprising two interengaging parts, one of said parts comprising a flange, a tubular portion substantially perpendicular thereto, a disk closing the end of said tubular portion remote from said flange, a bead having a substantially horizontal shoulder extending laterally from said tubular portion adjacent said disk, and the other of said parts comprising a flange, a solid, continuous tubular portion substantially perpendicular thereto and extending toward the flange of said first named part, the diameter of said last named tubular portion being slightly larger than that of the first named tubular portion in order that the said tubular portions may be telescoped, said second named tubular portion having a plurality of prongs bent inwardly and backwardly from the edge of said tubular portion remote from the flange so that the leading edges of said prongs engage the shoulder of said bead when the tubular portions are telescoped.

2. A lock seal comprising two interengaging parts, one of said parts comprising a flange, a tubular portion substantially perpendicular thereto, a bead having a substantially horizontal shoulder extending laterally from said tubular portion near the end thereof remote from said flange, and the other of said parts comprising a flange, a solid, continuous tubular portion substantially perpendicular thereto and extending toward the flange of said first named part, the diameter of said last named tubular portion being slightly larger than that of the first named tubular portion in order that the said tubular portions may be telescoped, said second named tubular portion having a plurality of prongs bent inwardly and backwardly from the edge of said tubular portion remote from the flange so that the leading edges of said prongs engage the shoulders of said bead when the tubular portions are telescoped.

3. A lock seal comprising two interengaging parts, one of said parts comprising a flange, a neck connected to said flange, a bead having a substantially horizontal shoulder extending laterally from said neck near the end thereof remote from said flange, and the other of said parts comprising a solid, continuous tubular member having a diameter slightly larger than that of said bead, a plurality of prongs extending inwardly and backwardly from the edge of said tubular portion nearest said flange of said first named part, so that the leading edges of said prongs engage the shoulders of said bead when said parts are telescoped.

In testimony whereof, I have signed my name to this specification this sixteenth day of November 1932.

FREDERICK W. LAENCHER.